(12) United States Patent
Moore et al.

(10) Patent No.: US 8,789,710 B1
(45) Date of Patent: Jul. 29, 2014

(54) GLASS SHEET TRANSPORT RACK

(71) Applicant: Moore Freight Service, Inc., Mascot, TN (US)

(72) Inventors: Daniel R. Moore, Knoxville, TN (US); Steve Sparks, Knoxville, TN (US)

(73) Assignee: Moore Freight Service, Inc., Mascot, TN (US)

( * ) Notice: Subject to any disclaimer, the term of this patent is extended or adjusted under 35 U.S.C. 154(b) by 0 days.

(21) Appl. No.: 13/827,947

(22) Filed: Mar. 14, 2013

(51) Int. Cl.
  *A47G 19/08* (2006.01)
  *A47F 7/00* (2006.01)
  *B62B 1/26* (2006.01)

(52) U.S. Cl.
  CPC ............... *A47F 7/0042* (2013.01); *B62B 1/268* (2013.01)
  USPC ...................................................... 211/41.14

(58) Field of Classification Search
  USPC ............... 211/41.14, 41.15, 41.16, 41.1, 198, 211/195, 49.1, 201; 248/176.1, 346.03, 248/346.02, 503; 206/448, 455
  See application file for complete search history.

(56) References Cited

U.S. PATENT DOCUMENTS

| | | | | |
|---|---|---|---|---|
| 1,590,698 A | * | 6/1926 | Ray ............................. | 211/41.1 |
| 3,596,755 A | * | 8/1971 | Bundy et al. ................. | 206/452 |
| 3,878,942 A | * | 4/1975 | Hansen et al. ................ | 206/454 |
| 3,955,676 A | * | 5/1976 | Hansen et al. ................ | 206/451 |
| 4,278,171 A | * | 7/1981 | Millhoan ...................... | 206/451 |
| 5,085,329 A | * | 2/1992 | Crowell et al. ............... | 211/195 |
| 5,988,243 A | * | 11/1999 | Ayala et al. .................. | 144/329 |
| 6,386,376 B1 | * | 5/2002 | Mendoza-Castillo et al. ......................... | 211/41.14 |
| 6,536,607 B1 | * | 3/2003 | Knoll et al. .................. | 211/41.14 |
| 6,910,591 B2 | * | 6/2005 | Knoll et al. .................. | 211/41.14 |
| 7,264,126 B1 | * | 9/2007 | Bergeron ..................... | 211/41.14 |
| 7,458,403 B2 | * | 12/2008 | Radermacher ............. | 144/286.1 |
| 8,376,291 B1 | * | 2/2013 | Groves ......................... | 248/166 |

* cited by examiner

*Primary Examiner* — Jonathan Liu
*Assistant Examiner* — James Twomey
(74) *Attorney, Agent, or Firm* — Waddey Patterson; Edward D. Lanquist, Jr.; Mark A. Pitchford (57) ABSTRACT

A glass transport rack includes a dual sided frame, a first knee brace, a first stop arm, and a second stop arm. The dual sided frame has a first face on a first side of the dual sided frame and a second face on a second side of the dual sided frame. Each face is operable to sport a glass sheet and a position between about 5 and about 30° from vertical and parallel to a longitudinal axis of the dual sided frame. The first knee brace is operable to adjustably extend from a first longitudinal end of the dual sided frame and has a first face coincident with a plane of the first face to support the glass sheet on the first face of the dual sided frame. The first and second stop arms are adjustable independent of one another.

16 Claims, 5 Drawing Sheets

GLASS SHEET TRANSPORT RACK

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to glass pane (i.e., plate glass) transport racks. More particularly, this invention pertains to adjustable glass pane transport racks operable to hold or support a plurality of glass pane sizes.

Glass panes (i.e., glass sheets or plates) are transported and stored in a substantially upright and inclined position on a rack. Stacks of glass sheets are secured to the rack with a rope or ratchet straps extending around the glass sheets or over the glass sheets. If the glass sheets are not properly secured to the rack by the rope or ratchet strap, the glass sheets may shift or fall from the rack. Further, if any of the glass sheets shift relative to one another, imperfections on the surface (e.g., digs or scratches) make the glass of inferior quality and often unusable.

Racks for transporting glass sheets are generally application specific. That is, a rack is generally sized to hold a specific size of glass sheet. If a rack made for one size of glass sheet is used with another sizable glass sheet, the glass sheets may slide on the rack, fall from the rack, or break on the rack. Further, when the size of the glass sheet does not match the size of the rack, it may not be possible to secure the glass sheet to the rack.

BRIEF SUMMARY OF THE INVENTION

Aspects of the present invention provide a dual sided glass sheet transport rack operable to adjust to and securely hold glass sheets of various sizes.

In one aspect, a rack is operable to support one or more glass sheets. The rack includes a dual sided frame, a first knee brace, a first stop arm, and a second stop arm. The dual sided frame has a first face on a first side of the dual sided frame and a second face on a second side of the dual sided frame. Each face is operable to sport a glass sheet and a position between about 5 and about 30° from vertical and parallel to a longitudinal axis of the dual sided frame. The first face and the second face are closer together near a top of the dual sided frame the near bottom of the dual sided frame. The first knee brace is operable to adjustably extend from a first longitudinal end of the dual sided frame and has a first face coincident with a plane of the first face of the dual sided frame. The first stop arm is operable to extend from the first longitudinal end of the dual sided frame. The first stop arm includes the longitudinal support beam and an axial protrusion. The axial protrusion is attached to the longitudinal support beam, and the axial protrusion extends generally away from the longitudinal axis beyond the first face of the dual sided frame. The second stop arm is operable to extend from the first longitudinal end of the dual sided frame. The second stop arm includes a longitudinal support beam and an axial protrusion attached to the longitudinal support beam. The actual protrusion extends generally away from the longitudinal axis beyond the second face of the dual sided frame. A distance between the axial protrusion of the first stop arm and the first longitudinal end of the dual sided frame is independent of a distance between the axial protrusion of the second stop arm and the first longitudinal end of the dual sided frame.

In another aspect, a rack is operable to support one or more glass sheets. The rack includes a dual sided frame and a first knee brace. The dual sided frame has a first face on a first side of the dual sided frame and a second face on a second side of the dual sided frame. Each face is operable to sport a glass sheet and a position between about 5 and about 30° from vertical and parallel to a longitudinal axis of the dual sided frame. The first face and the second face are closer together near a top of the dual sided frame the near bottom of the dual sided frame. The first knee brace is operable to adjustable extend from a first longitudinal end of the dual sided frame and has a first face coincident with a plane of the first face of the dual sided frame.

In another aspect, a rack is operable to support one or more glass sheets. The rack includes a dual sided frame, a first stop arm, and a second stop arm. The dual sided frame has a first face on a first side of the dual sided frame and a second face on a second side of the dual sided frame. Each face is operable to sport a glass sheet and a position between about 5 and about 30° from vertical and parallel to a longitudinal axis of the dual sided frame. The first face and the second face are closer together near a top of the dual sided frame the near bottom of the dual sided frame. The first stop arm is operable to extend from the first longitudinal end of the dual sided frame. The first stop arm includes the longitudinal support beam and an axial protrusion. The axial protrusion is attached to the longitudinal support beam, and the axial protrusion extends generally away from the longitudinal axis beyond the first face of the dual sided frame. The second stop arm is operable to extend from the first longitudinal end of the dual sided frame. The second stop arm includes a longitudinal support beam and an axial protrusion attached to the longitudinal support beam. The actual protrusion extends generally away from the longitudinal axis beyond the second face of the dual sided frame. A distance between the axial protrusion of the first stop arm and the first longitudinal end of the dual sided frame is independent of a distance between the axial protrusion of the second stop arm and the first longitudinal end of the dual sided frame.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As referred to herein, spatial reference terms such as top, bottom, up, down, above, below, higher, lower, vertical, and horizontal refer to parts of the rack when the rack is in an upright position.

Figure 1:
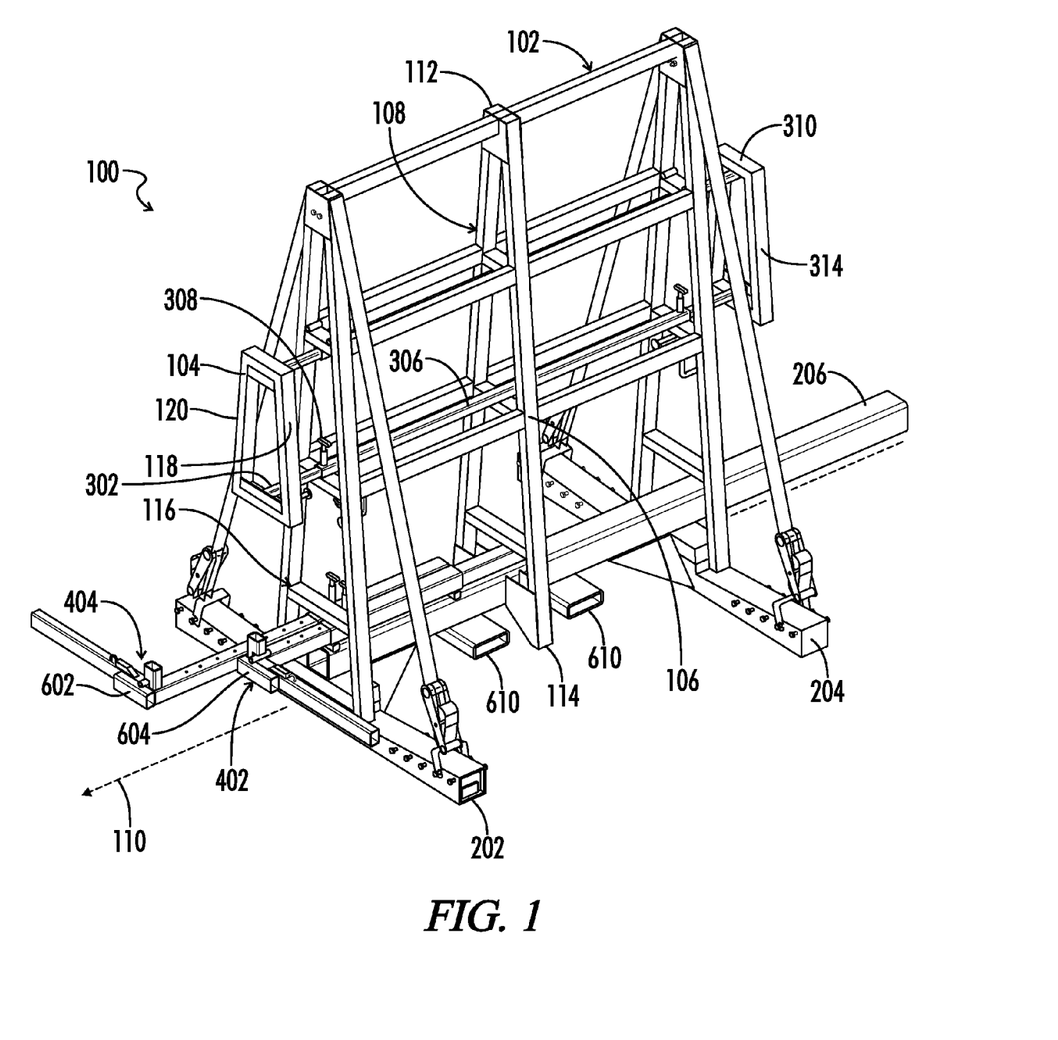
FIG. 1 is an elevated isometric view of a rack for transporting glass sheets.
Figure 2:
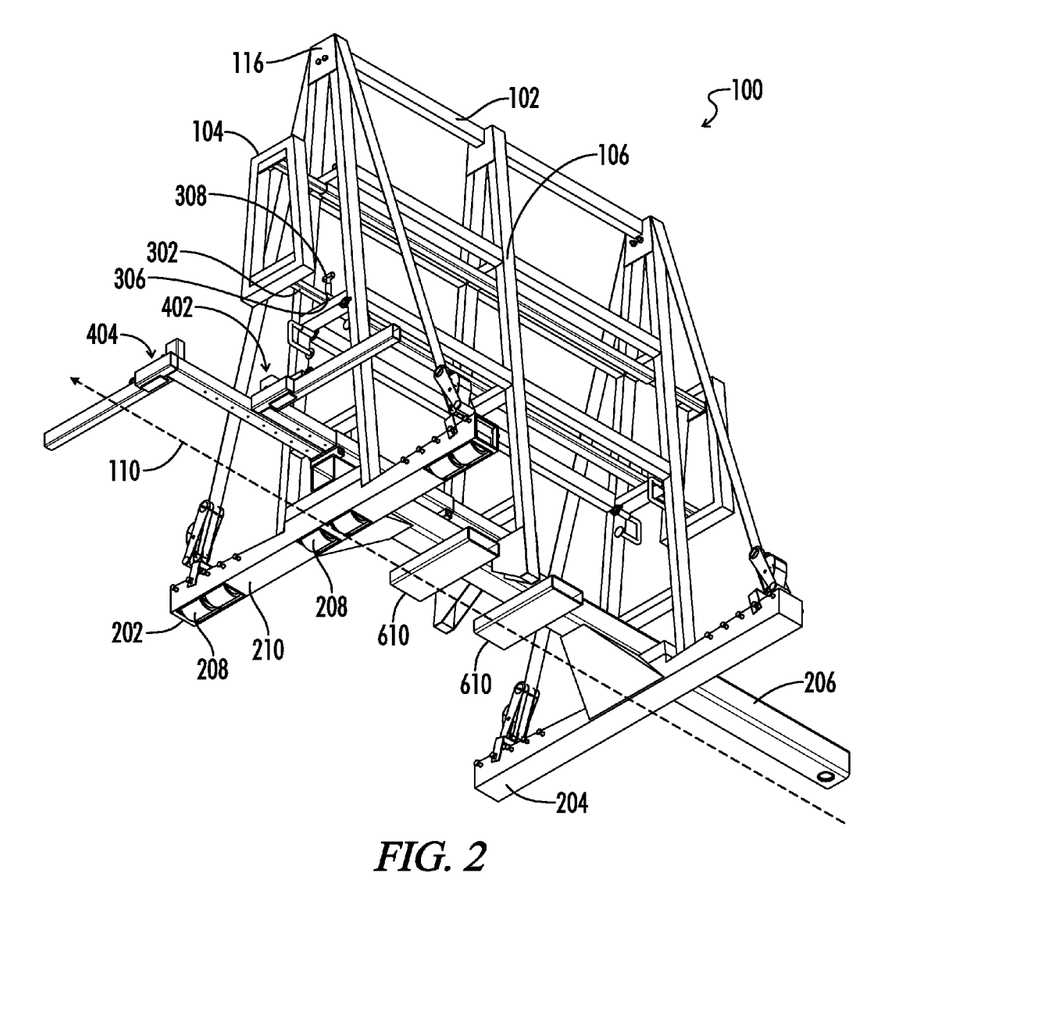
FIG. 2 is a depressed isometric view of the rack for transporting glass sheets of FIG. 1.
Figure 3:
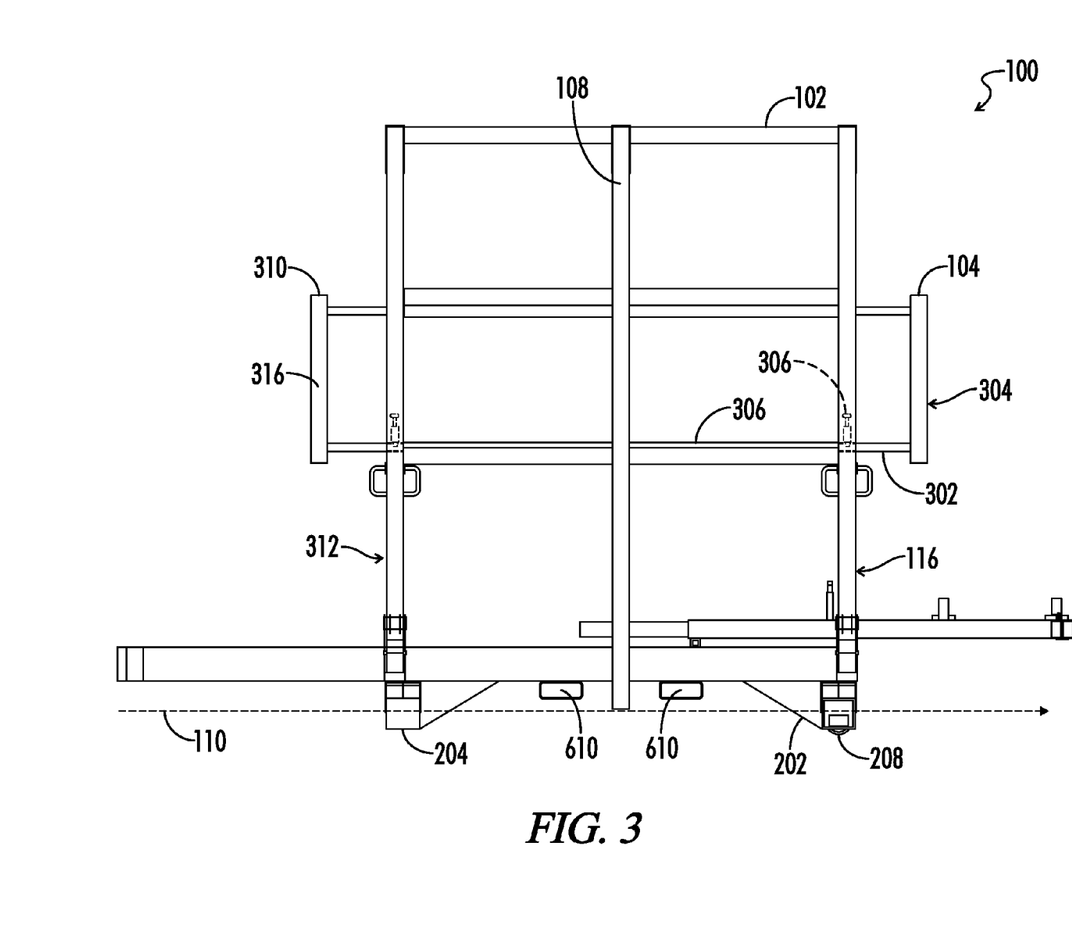
FIG. 3 is a perspective side view of the rack of FIGS. 1 and 2.

Referring to FIGS. 1-5, a rack 100 operable to support one or more glass sheets includes the dual sided frame 102 and a first knee brace 104. The dual sided frame 102 has a first face 106 on a first side of the dual sided frame 102, and a second face 108 on a second side of the dual sided frame 102. Each face is operable to support at least one glass sheet in a position between about 5 and about 30° from vertical and parallel to a longitudinal axis 110 of the dual sided frame 102. In FIGS. 1 and 3, the longitudinal axis 110 is shown at the bottom of the rack 100, however, as used and disclosed herein, the longitudinal axis 110 may be at any height within a vertical plane equidistant between the first face 106 and the second face 108. That is, the longitudinal axis 110 may be at any height within a plane extending vertically from the horizontal center of the rack 100 as appropriate to the context of a description herein. The first face 106 and the second face 108 are closer together near a top 112 of the dual sided frame 102 the near a bottom 114 of the dual sided frame 102. In one embodiment, the dual sided frame has a width of approximately 7 feet, and a height of approximately 9 feet.

The first knee brace 104 is operable to adjustably extend from a first longitudinal end 116 of the dual sided frame 102. The first knee brace 104 has a first face 118 coincident with a plane of the first face 106 of the dual sided frame 102. The first face 106 provides a substantially flat surface for a glass sheet to lay against when supported by the rack 100. The flat surface of the first face 106 defines the plane of the first face 106. The second face 108 of the dual sided frame 102 similarly defines a plane of the second face 108. A second face 120 of the first knee brace 104 is coincident with the plane of the second face 108 of the dual sided frame 102.

Referring particularly to FIG. 3, the first knee brace 104 also includes a longitudinal support beam 302. The longitudinal support beam 302 of the first knee brace 104 enables the first knee brace 104 to adjustably extend along a path parallel to the longitudinal axis 110 of the dual sided frame 102. The longitudinal support beam 302 has a plurality of detents. Each detent is operable to maintain an outer longitudinal surface 304 of the first knee brace 104 at a different predetermined longitudinal distance from the first longitudinal end 116 of the dual sided frame 102. The detents may be dimples, depressions, or holes in the longitudinal support beam 302 of the first knee brace 304. In one embodiment, each detent as a hole, and the dual sided frame 102 includes a first knee brace tube 306 and a spring-loaded first knee brace pin 308. The first knee brace tube 306 is operable to receive at least a portion of the longitudinal support beam 302 of the first knee brace 104. The spring-loaded first knee brace pin 308 is operable to engage one of the plurality of holes in the longitudinal support beam 302 of the first knee brace 104.

In one embodiment, the rack 100 also includes a second knee brace 310 operable to adjustably extend from a second longitudinal end 312 of the dual sided frame 102. The second longitudinal end 312 is opposite the first longitudinal end 116 of the dual sided frame 102. The second knee brace 310 has a first face 314 coincident with the plane of the first face 106 of the first side of the dual sided frame 102. The second knee brace 310 also has a second face 316 coincident with the plane of the second face 108 the second side of the dual sided frame 102.

Figure 5:
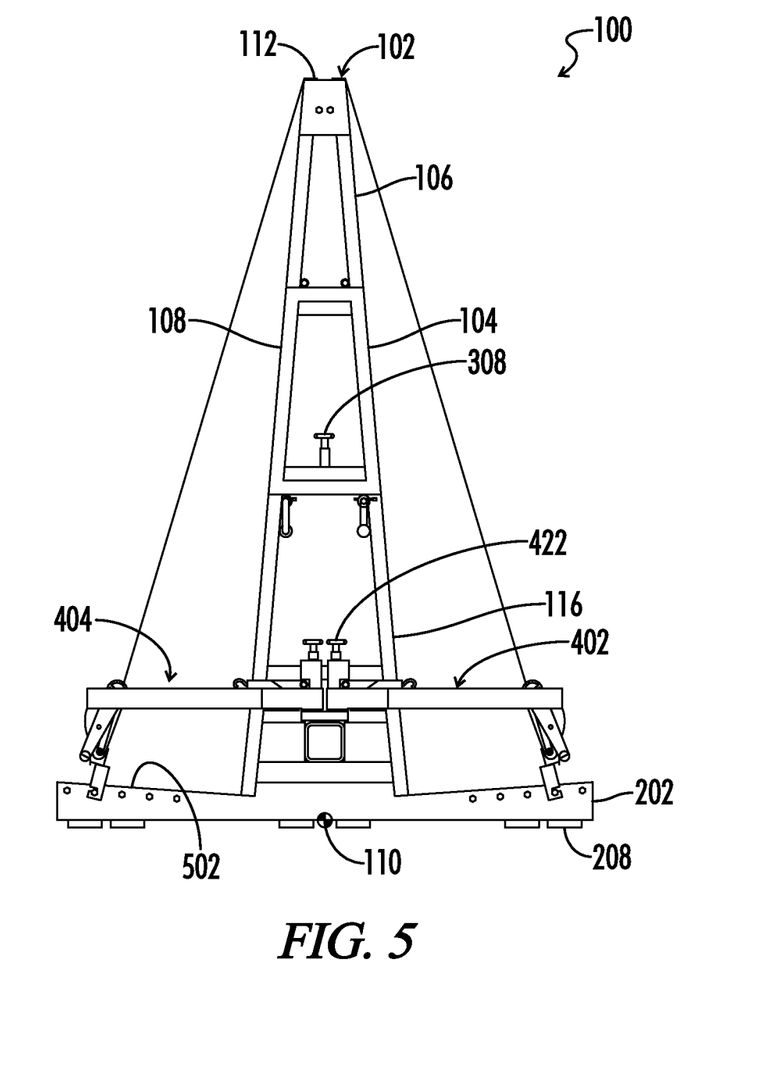
FIG. 5 is an end plan view of the rack of FIGS. 1-4.

Referring to FIG. 5, the first knee brace 104 has a cross section with respect to the longitudinal axis 110 that is generally trapezoidal. The second knee brace 310 is similarly shaped. Similarly, the dual sided frame 102 has a cross section with respect to the longitudinal axis 110 adjacent the first longitudinal end 116 of the dual sided frame 102 that is generally trapezoidal. The first knee brace 104 has a height less than a height of the dual sided frame 102, in the first knee brace 104 is approximately vertically centered with respect to the dual sided frame 102. The first knee brace 104 may also extend slightly above vertically centered with respect to the dual sided frame 102.

Referring to FIG. 2, the rack 100 also includes a first bottom beam 202, a second bottom beam 204, and a pickup support pipe 206. The first bottom beam 202 is at the first longitudinal end 116 of the dual sided frame 102. The second bottom beam 204 is at the second longitudinal end 312 of the dual sided frame 102. The second longitudinal end 312 is opposite the first longitudinal end 116. The first bottom beam 202 includes a plurality of rollers 208 extending through a bottom surface to 10 of the first bottom beam 202. The pickup support pipe 206 extends substantially parallel to the longitudinal axis 110 from the second longitudinal end 312 of the dual sided frame 102. In one embodiment, the pickup support pipe 206 is in contact with the second bottom beam 204 of the dual sided frame 102. The pickup support pipe 206 and the rollers 208 enable an operator to move the rack 100 by slightly lifting the pickup support pipe such that the weight of the rack 100 is mostly on the rollers 208. The operator can then move the rack 100 on the rollers 208 to a desired location. A top side 502 of the first bottom beam 202 and a topside 504 of the second bottom beam 204 are angled downward near the center of the rack 100. That is, the top side 502 of the first bottom beam 202 and the topside 504 of the second bottom beam 204 are higher further away from the longitudinal axis 110 and closer to the longitudinal axis 110. In one embodiment, the corresponding sections of the topsides of the first and second bottom beams are each perpendicular to the plane of their respective faces of the dual sided frame 102 as shown in FIG. 5.

Figure 4:
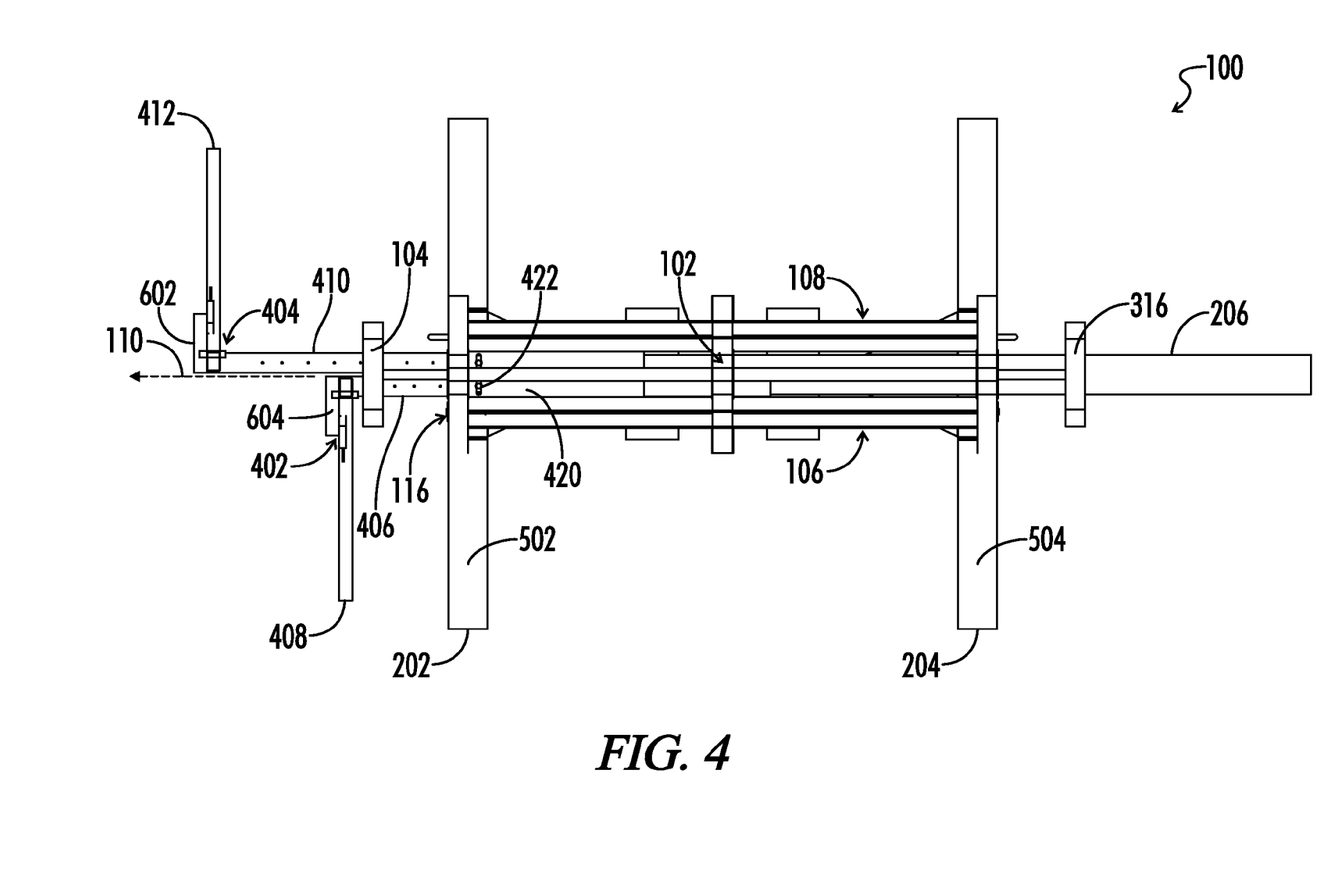
FIG. 4 is a top plan view of the rack of FIGS. 1-3.

Referring to FIG. 4, in one embodiment, the rack 100 further includes a first stop arm 402, and a second stop arm 404. The first stop arm 402 is operable to adjustably extend from the first longitudinal end 116 of the dual sided frame 102. The first stop arm includes a longitudinal support beam 406 and an axial protrusion 408 attached to the longitudinal support beam 406. The actual protrusion 408 extends generally away from the longitudinal axis 110 beyond the first face 106 of the dual sided frame 102. The second stop arm 404 is operable to adjustably extend from the first longitudinal end 116 of the dual sided frame 102. The second stop arm 404 includes the longitudinal support beam 410 and an axial protrusion 412. The actual protrusion 412 is attached to the longitudinal support beam 410, and the axial protrusion 412 extends generally away from the longitudinal axis 110 beyond the second face 108 of the dual sided frame 102. The distance between the axial protrusion 408 of the first stop arm 402 in the first longitudinal end 116 of the dual sided frame 102 is independent of the distance between the axial protrusion 412 of the second stop arm 404 and the first longitudinal end 116 of the dual sided frame 102.

In one embodiment, the longitudinal support beams of the first and second stop arms include a plurality of detents operable to maintain their respective axial protrusions at different predetermined distances from the first longitudinal end 116 of the dual sided frame 102. For example, the longitudinal support beam 406 of the first stop arm 402 has a plurality of detents. Each detent is operable to maintain the axial protrusion 408 of the first stop arm 402 at a different predetermined longitudinal distance from the first longitudinal end 116 of the dual sided frame 102. In one embodiment, each detent is a hole. It is contemplated that each detent may be a depression or dent instead of a hole. The dual sided frame 102 also includes a first stop arm tube 420 and a spring-loaded first stop arm pin 422. The first stop arm tube 420 is operable to receive at least a portion of the longitudinal support beam 406 of the first stop arm 402. The portion of the longitudinal support beam 406 of the first stop arm 402 received by the first stop arm tube 420 is a function of the distance between the axial protrusion 408 of the first stop arm 402 and the first longitudinal end 116 of the dual sided frame 102. The spring-loaded first stop arm pin 422 is operable to engage one of the plurality of holes (i.e. detents) in the longitudinal support beam 406 of the first stop arm 402. In one embodiment the adjustable stop arms and knee braces enable each side of the rack 100 to hold or support a glass sheet up to 102 inches tall and 144 inches long or wide. Additionally, because the stop arms are independently adjustable, one side can hold a 144 inch wide or long glass sheet while the other side holds a 130" wide or long glass sheet.

In one embodiment, the axial protrusions of the stop arms are hinged such that they can be folded up within the footprint of the dual sided frame 102. For example, the axial protrusion 408 of the first stop arm 402 is attached to the longitudinal support beam 406 of the first stop arm 402 via a hinge. Optionally, the hinge includes a latch to hold the axial protrusion in a fixed rotational position. In a first position of the hinge, the axial protrusion 408 extends substantially horizontally, and in a second position of the hinge, the actual protrusion 408 extend substantially vertically. The axial protrusions of the stop arms are operable to engage one or more glass sheets and prevent them from sliding. For example, the axial protrusion 408 of the first stop arm 402 is operable to engage one more glass sheets supported by the first face 106 of the dual sided frame. The axial protrusion 408 of the first stop arm 402 prevents the one or more glass sheets supported by the first face 106 of the dual sided frame 102 from sliding parallel to the longitudinal axis 110 toward the first longitudinal end 116 of the dual sided frame 102. In one embodiment, the first stop on 402 further includes a first bumper 604, and the second stop arm 404 further includes a second bumper 602.

The bumpers are at the first longitudinal ends of their respective stop arms. The bumpers may be, for example, polyurethane or rubber, and help to prevent shocking the glass if the rack 100 is pushed into an object such as a wall.

In one embodiment, the rack 100 further includes a pair of forklift tubes 610. The pair of forklift tubes 610 are sized and positioned to accept forks of a forklift such that the glass transport rack 100 may be moved by a forklift. Referring to FIG. 2, the pair of forklift tubes 610 is attached to the bottom of the pickup support pipe 206 about a center of the dual sided frame. Each tube 610 may be 3 inches tall, 8 inches wide, and 20 inches long with a ¼ inch wall.

Although described herein as spring-loaded, it is contemplated that the pins engaging the detents of the longitudinal support beams disclosed herein may be other than spring loaded. For example, gravity may be used to hold a standard pin within the detent when the detent is a hole.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful GLASS SHEET TRANSPORT RACK it is not intended that such references be construed as limitations upon the scope of this invention except as set forth in the following claims.

What is claimed is:

1. A rack operable to support one or more glass sheets, said rack comprising:
  a dual sided frame, wherein the dual sided frame has a first face on a first side of the dual sided frame, and a second face on a second side of the dual sided frame, each face operable to support a glass sheet in a position between about 5 and about 30 degrees from vertical and parallel to a longitudinal axis of the dual sided frame and wherein the first face and second face are closer together near a top of the dual sided frame than near a bottom of the dual sided frame;

a first knee brace operable to adjustably extend from a first longitudinal end of the dual sided frame, said first knee brace having a first face coincident with a plane of the first face of the dual sided frame and a second face coincident with a plane of the second face of the dual sided frame and wherein the first knee brace has a cross section with respect to the longitudinal axis that is generally trapezoidal;

a first stop arm operable to extend from the first longitudinal end of the dual sided frame, said first stop arm comprising a first longitudinal support beam and an first axial protrusion attached to the first longitudinal support beam, wherein the first axial protrusion extends generally away from the longitudinal axis beyond the first face of the dual sided frame; and a second stop arm operable to extend from the first longitudinal end of the dual sided frame, said second stop arm comprising a second longitudinal support beam and an second axial protrusion attached to the second longitudinal support beam, wherein the second axial protrusion extends generally away from the longitudinal axis beyond the second face of the dual sided frame, wherein:

a distance between the first axial protrusion of the first stop arm and the first longitudinal end of the dual sided frame is independent of a distance between the second axial protrusion of the second stop arm and the first longitudinal end of the dual sided frame.

2. A rack operable to support one or more glass sheets, said rack comprising:

a dual sided frame, wherein the dual sided frame has a first face on a first side of the dual sided frame, and a second face on a second side of the dual sided frame, each face operable to support a glass sheet in a position between about 5 and about 30 degrees from vertical and parallel to a longitudinal axis of the dual sided frame and wherein the first face and second face are closer together near a top of the dual sided frame than near a bottom of the dual sided frame; and a first knee brace operable to adjustably extend from a first longitudinal end of the dual sided frame, said first knee brace having a first face coincident with a plane of the first face of the dual sided frame and a second face coincident with a plane of the second face of the dual sided frame and wherein the first knee brace has a cross section with respect to the longitudinal axis that is generally trapezoidal;

the dual sided frame has a cross section with respect to the longitudinal axis adjacent the first longitudinal end of the dual sided frame that is generally trapezoidal; and the first knee brace has a height less than a height of the dual sided frame, and the first knee brace is approximately vertically centered with respect to the dual sided frame or above vertically centered with respect to the dual sided frame.

3. The rack of claim 2, wherein:

the first knee brace is operable to adjustably extend along a path parallel to the longitudinal axis of the dual sided frame;

the first knee brace comprises a longitudinal support beam having a plurality of detents, each detent operable to maintain an outer longitudinal surface of the first knee brace at a different predetermined longitudinal distance from the first longitudinal end of the dual sided frame; and each detent is a hole; and the dual sided frame comprises:

a first knee brace tube operable to receive at least a portion of the longitudinal support beam of the first knee brace; and a spring loaded first knee brace pin operable to engage one of the plurality of holes in the longitudinal support beam of the first knee brace.

4. The rack of claim 2, further comprising a second knee brace operable to adjustably extend from a second longitudinal end of the dual sided frame opposite the first longitudinal end of the dual sided frame, wherein the second knee brace has a first face coincident with the plane of the first face of the first side of the dual sided frame and a second face coincident with a plane of the second face of the second side of the dual sided frame.

5. The rack of claim 2, further comprising:

a first bottom beam at the first longitudinal end of the dual sided frame;

a second bottom beam at a second longitudinal end of the dual sided frame; wherein:

the second longitudinal end is opposite the first longitudinal end;

the first bottom beam comprises a plurality of rollers extending through a bottom surface of the first bottom beam; and a pick up support pipe extending substantially parallel to the longitudinal axis from the second longitudinal end of the dual sided frame, wherein the pickup support pipe is in contact with the second bottom beam of the dual sided frame, wherein:

a top side of the first bottom beam and a top side of the second bottom beam are angled downward such that the top side of the first bottom beam and the top side of the second bottom beam are higher further away from the longitudinal axis than closer to the longitudinal axis.

6. The rack of claim 2, further comprising a first stop arm operable to adjustably extend from the first longitudinal end of the dual sided frame, said first stop arm comprising a first longitudinal support beam and an first axial protrusion attached to the first longitudinal support beam, wherein the first axial protrusion extends generally away from the longitudinal axis beyond the first face of the dual sided frame; and a second stop arm operable to adjustably extend from the first longitudinal end of the dual sided frame, said second stop arm comprising a second longitudinal support beam and an second axial protrusion attached to the second longitudinal support beam, wherein the second axial protrusion extends generally away from the longitudinal axis beyond the second face of the dual sided frame, wherein:

a distance between the first axial protrusion of the first stop arm and the first longitudinal end of the dual sided frame is independent of a distance between the second axial protrusion of the second stop arm and the first longitudinal end of the dual sided frame.

7. The rack of claim 6, wherein the axial protrusion of the first stop arm is attached to the longitudinal support beam of the first stop arm via a hinge, said hinge having a first position wherein the axial protrusion extends substantially horizontally and a second position wherein the axial protrusion extends substantially vertically.

8. The rack of claim 6, wherein the axial protrusion of the first stop arm is operable to engage one or more glass sheets supported by the first face of dual sided frame and prevent the one or more glass sheets from sliding parallel to the longitudinal axis toward the first longitudinal end of the dual sided frame.

9. A rack operable to support one or more glass sheets, said rack comprising:
- a dual sided frame, wherein the dual sided frame has a first face on a first side of the dual sided frame, and a second face on a second side of the dual sided frame, each face operable to support a glass sheet in a position between about 5 and about 30 degrees from vertical and parallel to a longitudinal axis of the dual sided frame and wherein the first face and second face are closer together near a top of the dual sided frame than near a bottom of the dual sided frame;
- a first bottom beam at the first longitudinal end of the dual sided frame, wherein the first bottom beam is substantially perpendicular to the longitudinal axis;
- a second bottom beam at a second longitudinal end of the dual sided frame; wherein:
  - the second longitudinal end is opposite the first longitudinal end;
  - the first bottom beam comprises a plurality of rollers extending through a bottom surface of the first bottom beam; and
  - a top side of the first bottom beam and a top side of the second bottom beam are angled downward such that the top side of the first bottom beam and the top side of the second bottom beam are higher further away from the longitudinal axis than closer to the longitudinal axis;
- a first knee brace operable to extend from a first longitudinal end of the dual sided frame, said first knee brace having a first face coincident with a plane of the first face of the dual sided frame and a second face coincident with a plane of the second face of the dual sided frame, wherein the first knee brace has a cross section with respect to the longitudinal axis that is generally trapezoidal;
- a first stop arm operable to adjustably extend from the first longitudinal end of the dual sided frame, said first stop arm comprising a first longitudinal support beam and an first axial protrusion attached to the first longitudinal support beam, wherein the first axial protrusion extends generally away from the longitudinal axis beyond the first face of the dual sided frame; and
- a second stop arm operable to adjustably extend from the first longitudinal end of the dual sided frame, said second stop arm comprising a second longitudinal support beam and an second axial protrusion attached to the second longitudinal support beam, wherein the second axial protrusion extends generally away from the longitudinal axis beyond the second face of the dual sided frame, wherein:
  - a distance between the first axial protrusion of the first stop arm and the first longitudinal end of the dual sided frame is independent of a distance between the second axial protrusion of the second stop arm and the first longitudinal end of the dual sided frame;
- a first strap extending from the top of the dual sided frame to one of a plurality of mounting positions on the first bottom beam; and
- a second strap extending from the top of the dual sided frame to one of a plurality of mounting positions on the second bottom beam, wherein the first and second straps cooperate with the downward angle of the tops of the first and second bottom beams to secure a lower edge of a supported glass sheet against the first face of the dual sided frame.

10. The rack of claim 9, wherein:
- the first longitudinal support beam of the first stop arm has a plurality of detents, each detent operable to maintain the first axial protrusion of the first stop arm at a different predetermined longitudinal distance from the first longitudinal end of the dual sided frame; and
- each detent is a hole; and
- the dual sided frame comprises:
  - a first stop arm tube operable to receive at least a portion of the first longitudinal support beam of the first stop arm; and
  - a spring loaded first stop arm pin operable to engage one of the plurality of holes in the first longitudinal support beam of the first stop arm.

11. The rack of claim 9, wherein the first axial protrusion of the first stop arm is attached to the first longitudinal support beam of the first stop arm via a hinge, said hinge having a first position wherein the axial protrusion extends substantially horizontally and a second position wherein the axial protrusion extends substantially vertically.

12. The rack of claim 9, wherein the first axial protrusion of the first stop arm is operable to engage one or more glass sheets supported by the first face of dual sided frame and prevent the one or more glass sheets from sliding parallel to the longitudinal axis toward the first longitudinal end of the dual sided frame.

13. The rack of claim 9, further comprising:
- a pick up support pipe extending substantially parallel to the longitudinal axis from the second longitudinal end of the dual sided frame, wherein the pickup support pipe is in contact with the second bottom beam of the dual sided frame.

14. The rack of claim 9, wherein the first stop arm further comprises a first bumper at a first longitudinal end of the first stop arm and the second stop arm further comprises a second bumper at a first longitudinal end of the second stop arm.

15. The rack of claim 9, further comprising a second knee brace operable to extend from a second longitudinal end of the dual sided frame opposite the first longitudinal end of the dual sided frame, wherein the second knee brace has a first face coincident with the plane of the face of the first side of the dual sided frame and a second face coincident with a plane of a second face of the dual sided frame.

16. The rack of claim 9, wherein:
- the dual sided frame has a cross section with respect to the longitudinal axis adjacent the first longitudinal end of the dual sided frame that is generally trapezoidal; and
- the first knee brace has a height less than a height of the dual sided frame, and the first knee brace is approximately vertically centered with respect to the dual sided frame or slightly above vertically centered with respect to the dual sided frame.

* * * * *